United States Patent
Lopez et al.

(10) Patent No.: US 9,619,252 B2
(45) Date of Patent: Apr. 11, 2017

(54) RECONFIGURABLE AVIONICS EQUIPMENT AND METHOD OF RECONFIGURING SUCH EQUIPMENT

(71) Applicant: Airbus Operations (S.A.S.), Toulouse (FR)

(72) Inventors: Juan Lopez, Grenade sur Garonne (FR); Emilie Claudel, Leguevin (FR); Frédéric Lamy, Grenade sur Garonne (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/485,105

(22) Filed: Sep. 12, 2014

(65) Prior Publication Data
US 2015/0100774 A1    Apr. 9, 2015

(30) Foreign Application Priority Data

Sep. 13, 2013   (FR) ...................................... 13 58810

(51) Int. Cl.
*G06F 3/00*     (2006.01)
*G06F 9/445*    (2006.01)
(Continued)

(52) U.S. Cl.
CPC ............ *G06F 9/44505* (2013.01); *G06F 8/65* (2013.01); *H04L 12/40* (2013.01); *H04L 41/082* (2013.01);
(Continued)

(58) Field of Classification Search
CPC ................. G06F 9/44505; G06F 9/546; H04L 2012/4028; H04L 41/082; H04L 41/0803
(Continued)

(56) References Cited

U.S. PATENT DOCUMENTS 7,352,744 B2    4/2008   Etienne et al.
8,386,660 B2    2/2013   Minot
(Continued)

FOREIGN PATENT DOCUMENTS

EP    2 306 672    4/2011
FR    2832011      5/2003
(Continued)

OTHER PUBLICATIONS

"AFDX protocol tutorial" available at URL http://sierrasales.com/pdfs/AFDXTutorial.pdf 2005.
(Continued)

*Primary Examiner* — Ernest Unelus
(74) *Attorney, Agent, or Firm* — Jenkins, Wilson, Taylor & Hunt, P.A.

(57) ABSTRACT

The disclosure relates to reconfigurable avionics equipment, subscribed to an onboard network such as an AFDX® network. The equipment has an architecture in two portions, a functional portion which makes it possible to perform the function proper to the piece of equipment and an interfacing portion, which allows the functional portion to communicate over the network. The interfacing portion includes a configuration file separate from the one used to configure the functional portion and able to be downloaded, using the network, independently of the latter.

8 Claims, 5 Drawing Sheets

(51) Int. Cl.
*H04L 29/08* (2006.01)
*H04L 12/40* (2006.01)
*H04L 12/24* (2006.01)

(52) U.S. Cl.
CPC .......... *H04L 67/12* (2013.01); *H04L 41/0803* (2013.01); *H04L 2012/4028* (2013.01)

(58) Field of Classification Search
USPC .......................................................... 710/12
See application file for complete search history.

(56) References Cited

U.S. PATENT DOCUMENTS

| | | |
|---|---|---|
| 9,077,641 B2 | 7/2015 | Reich et al. |
| 2005/0156777 A1* | 7/2005 | King et al. ...................... 342/29 |
| 2007/0183435 A1 | 8/2007 | Kettering et al. |
| 2011/0066763 A1* | 3/2011 | Minot ............................ 710/12 |
| 2012/0290692 A1* | 11/2012 | Reich et al. .................. 709/220 |
| 2014/0372471 A1 | 12/2014 | Claudel et al. |

FOREIGN PATENT DOCUMENTS

| | | |
|---|---|---|
| WO | WO 2007/085832 | 8/2007 |
| WO | WO 2008/054507 | 5/2008 |
| WO | WO 2012/010863 | 1/2012 |

OTHER PUBLICATIONS

French Preliminary Search Report for Application No. FR 1355576 dated Feb. 10, 2014.
French Preliminary Search Report for Application No. 1358810 dated Mar. 5, 2014.

* cited by examiner

RECONFIGURABLE AVIONICS EQUIPMENT AND METHOD OF RECONFIGURING SUCH EQUIPMENT

TECHNICAL FIELD

This disclosure relates to the field of onboard networks and more particularly that of avionics equipment subscribed to such a network.

BACKGROUND

The field of aeronautical telecommunications has undergone substantial development in the last few years.

Conventional avionics networks use a bus topology to which are connected pieces of avionics equipment. These networks comply with standard ARINC 429.

The more recent avionics networks are generally of the AFDX® (Avionics Full Duplex Switched Ethernet) type. The AFDX® network was specifically developed for the constraints of aeronautics and is based on the principle of switched Ethernet. Recall that switched Ethernet networks can operate under two separate modes but compatible between them: a shared mode, wherein the same physical support is shared between the terminals, with random access and detection of collisions between frames, and a switched mode, wherein the terminals exchange frames by virtual connections also called virtual links, which guarantees the absence of collisions.

The AFDX® network underwent a standardisation in standard ARINC 664, part 7. There is in particular a description of the AFDX® network in the document entitled "AFDX protocol tutorial" available at URL http://sierrasales.com/pdfs/AFDXTutorial.pdf as well as a presentation of the virtual links in FR-A-2832011 filed in the name of this applicant. Simply recall here that the AFDX® network is full-duplex, deterministic and redundant.

Full-duplex means that each subscriber to the network (terminal, calculator) can simultaneously send and receive frames over the network. The AFDX® network is also deterministic, in that it implements virtual links that have guaranteed characteristics in terms of latency limits, physical flow segregation, bandwidth and flowrate. To do this, each virtual link has a path reserved from end to end through the network. Finally the AFDX® network is redundant because the underlying Ethernet network is duplicated for reasons of availability.

A piece of equipment subscribed to an AFDX® network is directly connected to a switch of this network. The data of a subscriber is sent in the form of IP packets encapsulated in Ethernet frames. Contrary to conventional Ethernet switching (that uses the Ethernet address of the recipient), the switching of frames on an AFDX® network uses a virtual link identifier included in the frame header. When a switch receives a frame on one of its input ports, it reads the virtual link identifier and determines using its switching table the output port or ports whereon it has to be sent.

A source piece of equipment subscribed to the AFDX® network can send AFDX® frames to one or several pieces of recipient equipment subscribed to the same network, using a virtual link (unicast in the first case and multicast in the second case).

SUMMARY

An object of this disclosure is to simplify the operation of reconfiguring an avionics network, in particular an AFDX® network, in the case of a modification of a communication on this network. More particularly, the disclosure aims to propose avionics equipment that does not require having recourse to a systematic intervention of the supplier of the equipment in case of a modification of a communication on the network, sent by or received by this equipment.

The subject matter herein discloses reconfigurable avionics equipment for connection to an onboard network on board an aircraft, the equipment being adapted to perform a predetermined function and comprising:
  a first portion adapted to perform the function, with this first portion comprising first hardware and first software, as well as a first configuration file to configure the first hardware and/or the first software;
  a second portion adapted to interface the first portion with the network, with this second portion comprising second hardware and second software as well as a second configuration file to configure the second hardware and/or the second software, with the second configuration file being separate from the first in such a way as to be able to be downloaded from the network independently of the latter.

Hence, it is possible to configure the communications interface of the equipment independently without intervention on the functional portion of the equipment and therefore without having recourse to the supplier of the equipment.

Reconfiguring can be performed simply and effectively by a maintenance operator.

According to a first embodiment, the first software comprises a first downloading software (funct_downld) adapted to download from the network the first configuration file and, independently of the latter, the second configuration file.

Advantageously, the network is an AFDX® network and the first downloading software is compliant with the ARINC 615A standard.

According to a second embodiment, the second software comprise a second downloading software (interf_downld) adapted to download the second configuration file from the network.

In this case also, the network is advantageously an AFDX® network and the second downloading software is compliant with the ARINC 615A standard.

According to an alternative, the second downloading software is executed by a processor that is dedicated to it.

The first and second hardware can also have at least one common element.

BRIEF DESCRIPTION OF THE DRAWINGS

Other characteristics and advantages of the disclosure shall appear when reading the preferred embodiments of the disclosure, in reference to the attached figures wherein.

DETAILED DESCRIPTION

Figure 1:
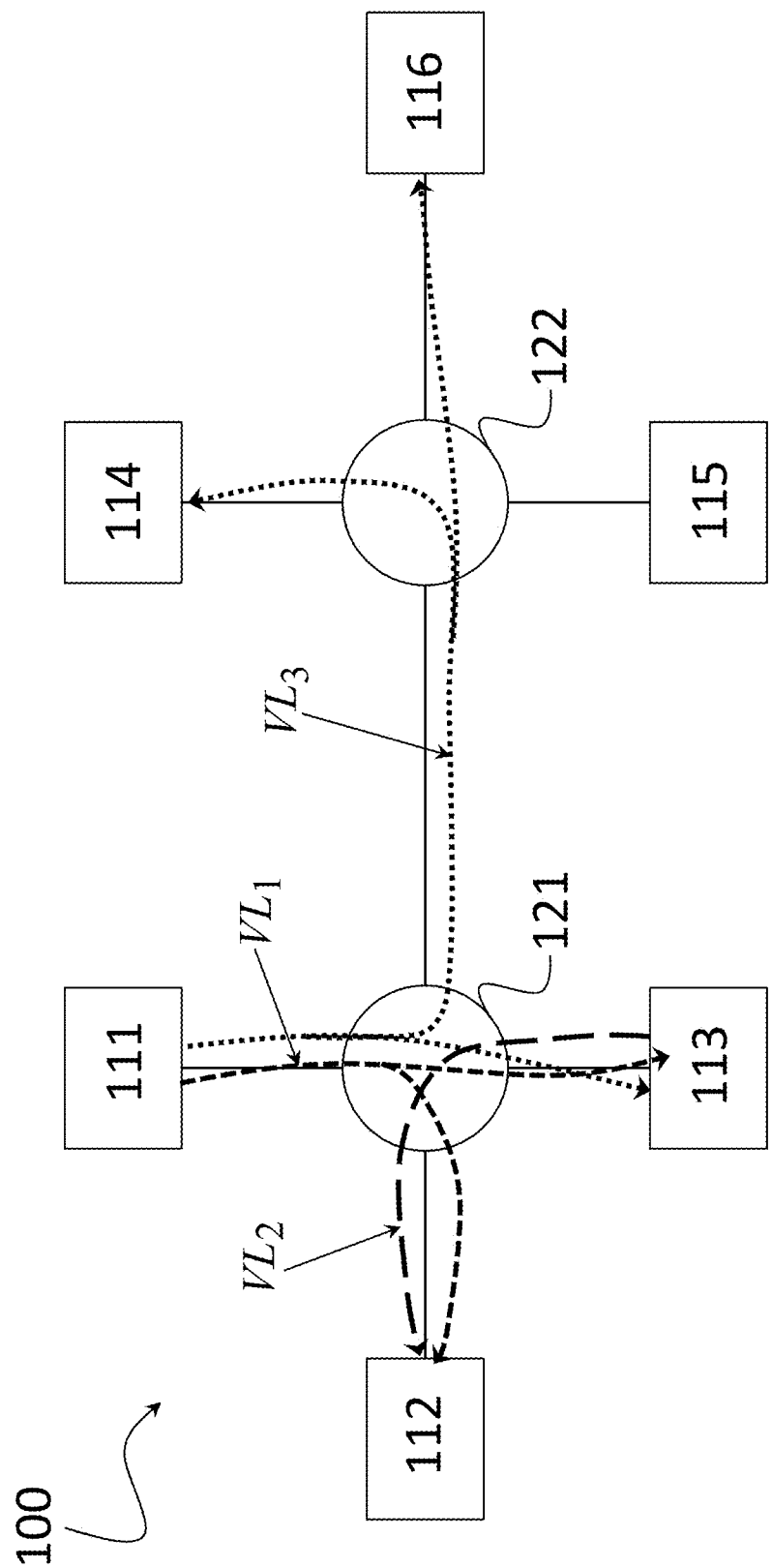
FIG. 1, shows a simplified example of an AFDX® network with several subscribers.

FIG. 1 shows a simplified example of an AFDX® network 100, to which are subscribed various avionics equipment 111 to 116. The AFDX® network is constituted of physical connections (twisted pair) connecting the subscribed pieces of equipment to the frame switches 121, 122 as well as the frame switches between themselves. FIG. 1 shows a virtual link (multicast), $VL_1$, connecting the piece of equipment 111 to the pieces of equipment 111 and 113, a virtual link (unicast), $VL_2$, connecting the piece of equipment 113 to the piece of equipment 112, and a virtual link (multicast), $VL_3$, connecting the piece of equipment 111 to the pieces of equipment 113, 114 and 116.

Each switch comprises a switching table that allows it to switch the packets according to the virtual link identifiers present in the packet headers, as indicated hereinabove.

Each virtual link is characterised by its path through the network (i.e. by all of the input port and output port pairs of the switches that this link passes through), by the maximum size of the frames and by the bandwidth that is allocated to it (minimum time interval between two consecutive frames on the link).

The configuration of the virtual links in the AFDX® network supposes not only storing the switching tables in the frame switches but also configuring the switching interfaces of the pieces of equipment (source and recipient) subscribed to the network.

This configuration is carried out in practice using a network configuration file, referred to as an NCD (Network Configuration Data) files as well as a plurality of subscriber configuration files. The network configuration file makes it possible to extract the switching tables in the form of binary files which will then be downloaded and stored in the various switches. The subscriber configuration files make it possible to configure each piece of subscriber equipment. Each equipment supplier receives, for each piece of subscribed equipment, a configuration file. He extracts from it the parameters that allow him to deliver the equipment with the adequate configuration, in particular that required for its communications interface.

However, any modification in the communication of the network requires not only loading new switching tables into the switches but also reconfiguring the pieces of equipment. Suppliers must then reconfigure them or change them if the latter cannot be downloaded.

As an example, if it is desired to modify the size of the frames or the bandwidth on a virtual link, the following must be modified:
the binary files of the switches that the virtual link passes through (in order to reject the frames that are not compliant with the new specifications);
the configuration files for the source equipment and for the recipient equipment or pieces of equipment.

It is consequently understood that a modification in the communication over the network can be cumbersome and expensive in terms of time since it entails the systematic intervention of the suppliers of avionics equipment.

In what follows, an avionics network that connects a plurality of pieces of avionics equipment is disclosed. Avionics network means an onboard network or intended to be brought onboard an aircraft. The avionics network can in particular be an ARINC 429 network, a CAN bus, an AFDX® network such as presented in the introduction. The topology of the network can be of any such type (star, ring, bus, Daisy Chain, etc.).

For the purposes of illustration and without prejudice to generalisation, we shall in what follows limit ourselves to one AFDX® network. More particularly we shall consider the pieces of avionics equipment that are subscribed, in other words connected, to this network. These pieces of avionics equipment can be replaceable elements referred to as LRUs (Line Replacement Units) and, when the architecture of the avionics platform is of the IMA (Integrated Modular Architecture) type, generic calculation modules referred to as CPIOMs (Core Processing Input Output Modules) or input/output modules referred to as IOMs (Input Output Modules) or remote data concentrators referred to as CRDCs (Common Remote Data Concentrators). This disclosure is not limited to a particular type of avionics equipment but each piece of equipment must have a function that is proper to it (calculation, data acquisition, data concentration of various sensors, monitoring, regulation, etc.) and a communications interface that allows it to be connected to the avionics network.

The idea at the basis of the disclosure consists in dissociating in the avionics equipment the functional portion and the communications interface, in such a way as to allow for a configuration independent of the latter.

Figure 2:
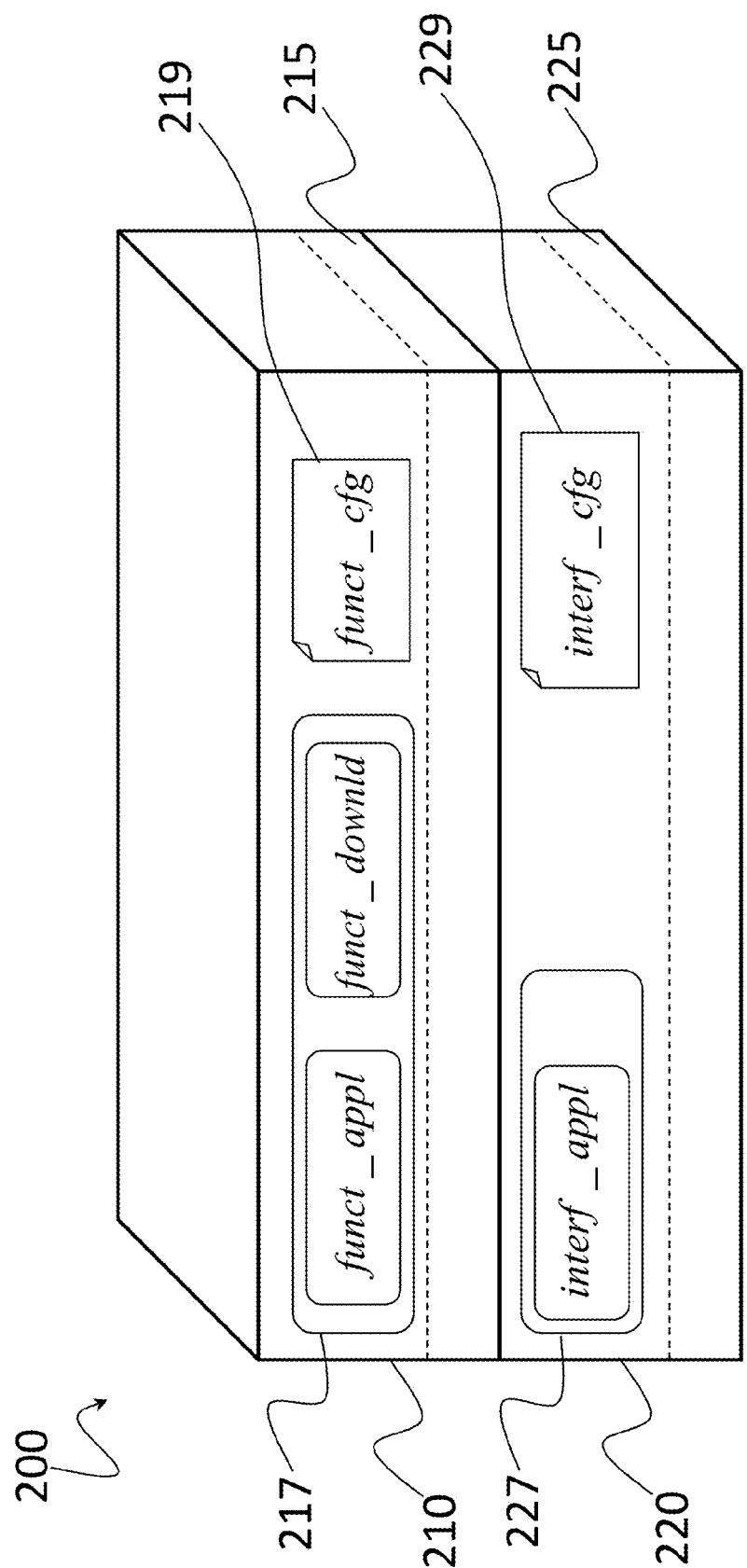
FIG. 2 shows the architecture of a avionics equipment according to a first embodiment of the disclosure.

More precisely, FIG. 2 diagrammatically shows the architecture of a avionics equipment according to a first embodiment of the disclosure.

The architecture of the equipment, 200, is shown here according to a functional breakdown. Equipment 200 comprises a first portion, referred to as functional portion, 210, that implements the proper function of the equipment and a second portion, referred to as interfacing portion, 220, which allows the functional portion to communicate over the network.

The first portion 210 comprises first hardware 215 such as CPU(s), memory or memories, internal bus, etc. and software 217 comprising the operating system (OS), an application or applications (funct_appl) that perform the function that is proper to the equipment, referred to hereinafter as functional applications, drivers, etc.

This first portion finally comprises a first configuration file (funct-cfg), 219, which makes it possible to configure the first hardware and/or the first software, in particular the functional applications.

The first software 217 includes a downloading software (funct_downld) from the network. This downloading software makes it possible in particular to download from the network the first configuration file as well as, where applicable all or a portion of the functional applications. For example, if the network is an AFDX® network the downloading software is compliant with the ARINC 615A standard.

The second portion 220 comprises second hardware 225, such as the hardware interface with the network (comprising buses, buffers, etc.) carried out in the form of an ASIC or FGPA circuit, microcontrollers, memory, etc. Note that the first and second hardware can share common elements, such as a processor (CPU).

The second portion further comprises second software 227, which includes the communications application, as well as a configuration file of the interface 229, also called hereinafter second configuration file.

The communications application (interf_appl) in particular manages the communications protocol stack which allows the functional applications to exchange messages with remote applications.

The second configuration file (interf_cfg) makes it possible to configure the hardware interface 225 as well as the communications application by parameters extracted or calculated using the second configuration file. The second configuration file is separate from the first one: it can in particular be downloaded, modified, stored and read independently of the first one.

In the first embodiment of the avionics equipment according to the disclosure, the second configuration file is downloaded by the downloading software (funct_download) which is part of the first software. More generally, this downloading software makes it possible to download the first and second software (excluding the operating system and, of course, the downloading software itself) as well as the first and second configuration files.

It is however essential to note that the downloading software can download the second configuration file independently. The configuration file of the interface can as such be updated independently of the one configuring the functional portion. Maintenance operators or network operators can then reconfigure the hardware profile and/or the software profile of the interface without having to send the equipment back to the supplier and without having to perform another certification for the equipment.

Figure 3:
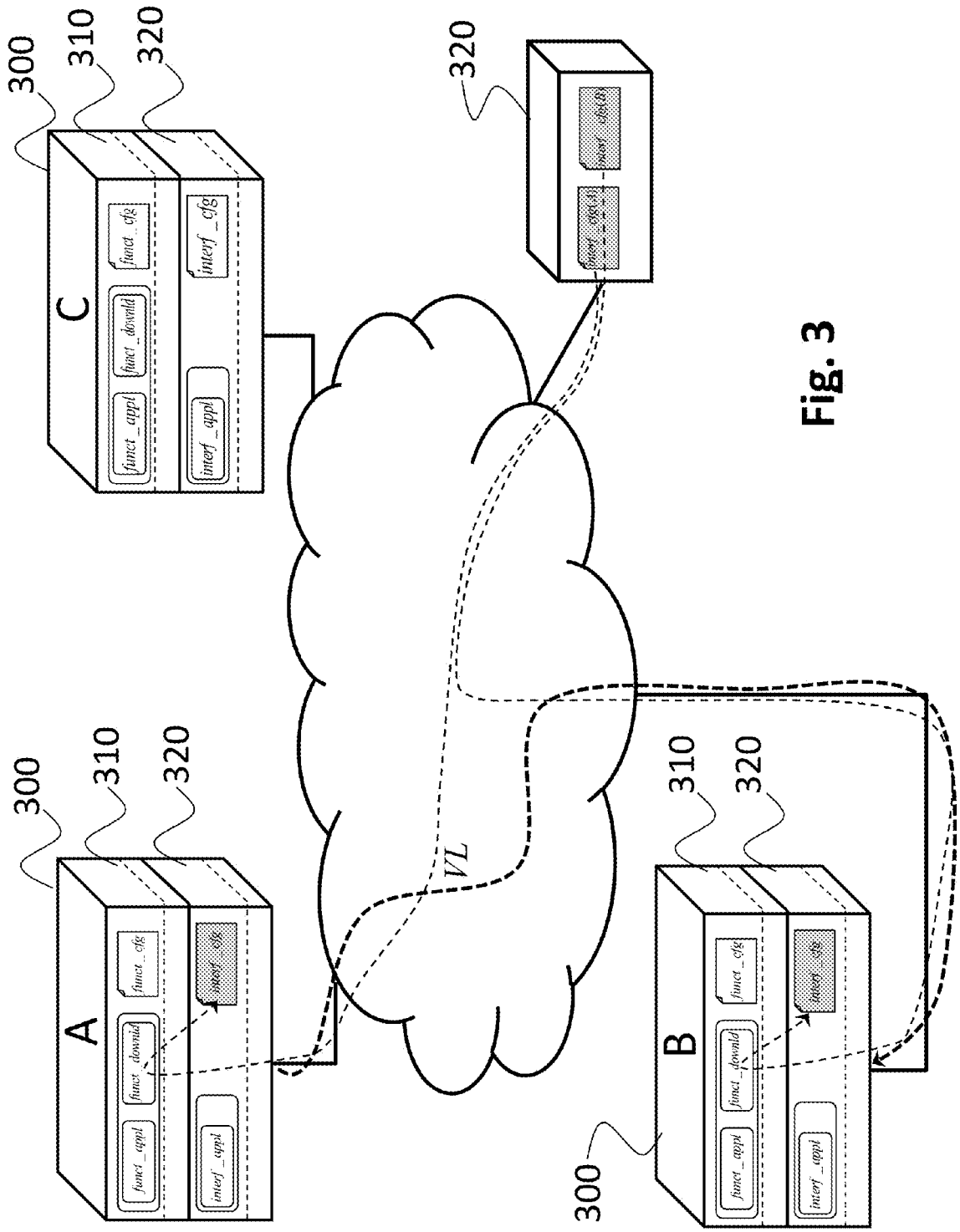
FIG. 3 diagrammatically shows an example of reconfiguring avionics equipment according to the first embodiment of the disclosure.

The FIG. 3 shows an example of a reconfiguring operation of avionics equipment according to the first embodiment of the disclosure.

This figure shown an avionics network, here an AFDX® network, to which are subscribed a plurality of pieces of avionics equipment, 300. The pieces of avionics equipment have the architecture described in relation with FIG. 2 and each one consequently comprises a first functional portion 310 and an interfacing portion, 320. A terminal (not onboard) for downloading, 350, is also shown, also referred to as "Data Loader", which makes it possible to download software via a download gateway (not shown), intended for one or several pieces of equipment of the aircraft.

The download terminal is used here to update the switching tables of the network as well as the configuration files of the interfaces of the various pieces of avionics equipment.

Downloading the interface configuration files is here carried out in this embodiment via the first downloading software (funct_download) of the functional portions 310.

Downloading the interface configuration files is carried out thanks to a conventional file transfer protocol (TFTP, FTP) between the download terminal 350 and the downloading software present in the first portions of the pieces of equipment.

If it is supposed for example that it is a question of modifying the identifier of a virtual link (VL) between a source piece of equipment A and a recipient piece of equipment B, the following will be downloaded by the download terminal:
- the interface configuration file (interf_cfg(A)) of the source piece of equipment A, in such a way that the frames sent over the virtual link do indeed contain the new identifier in their headers;
- the interface configuration file (interf_cfg(B)) for the recipient piece of equipment B, in such a way that the frames received over this link, containing the identifier in question, are not rejected by the interface;
- the switching tables for the switches that this virtual link passes through, in such a way as to substitute the old identifier in these tables with the new one.

Note that this update does not affect the functional applications of the pieces of equipment A and B in any way.

Those skilled in the art will understand that similar conclusions are reached if another parameter of the virtual link had to be modified. Furthermore, if the virtual link is multicast, a downloading of the interface configuration files in each of the recipient pieces of equipment of this virtual link will have to be carried out.

Figure 4:
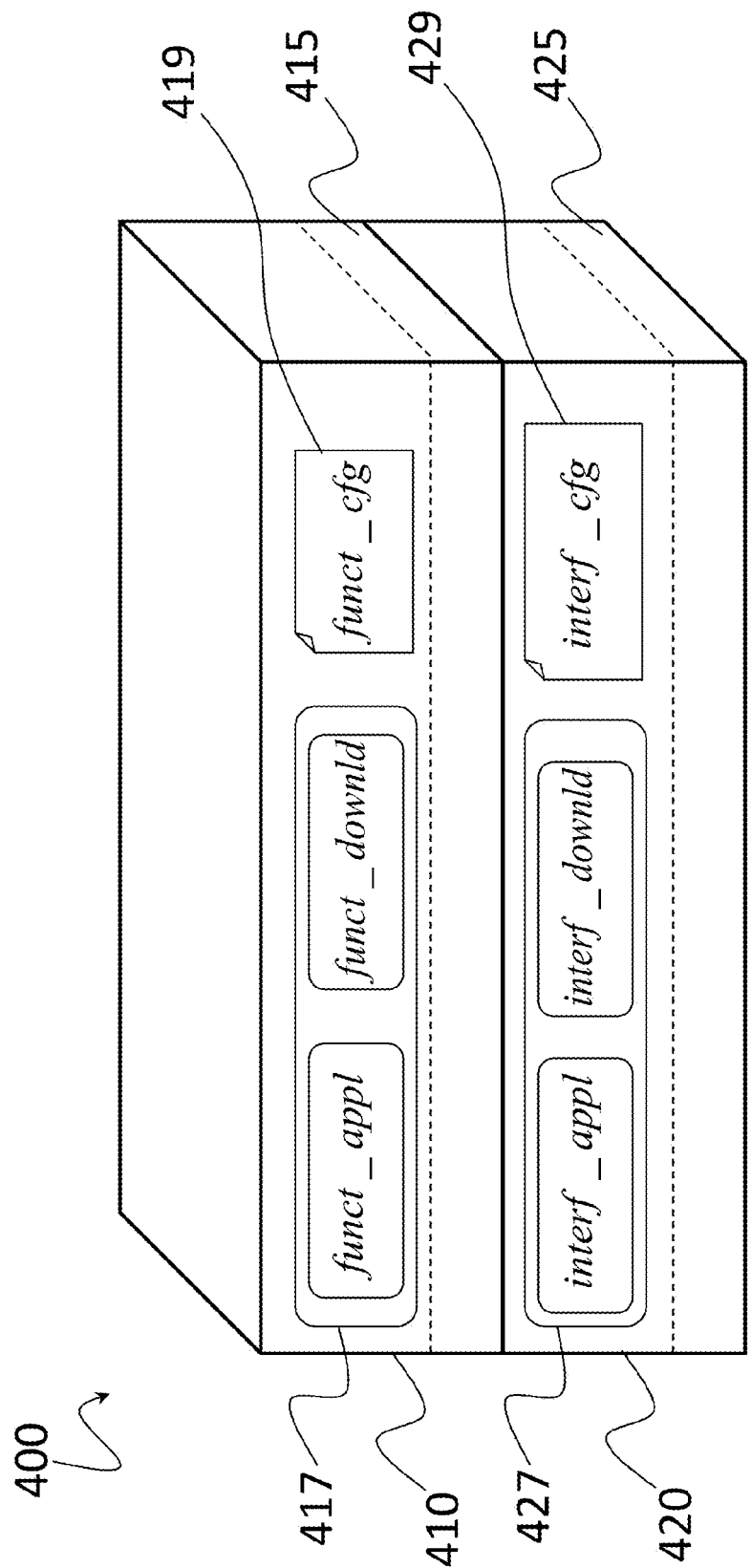
FIG. 4 shows the architecture of a avionics equipment according to a second embodiment of the disclosure.

FIG. 4 shows the architecture of a avionics equipment according to a second embodiment of the disclosure.

This second embodiment is distinguished from the first one in that the second interfacing portion of the equipment has its own downloading software.

More precisely, the functional portion of the equipment, 410, has first hardware 415, first software and a first configuration file respectively identical to the elements, 215, 217 and 219 of FIG. 2.

The interfacing portion, 420, comprises in the same way second hardware 425, second software 427 and a second configuration file, 429. The second hardware 425 and the second configuration file 429 are respectively identical to the elements 225 and 229 of FIG. 2. However the software 427 includes in addition to the communications application a second downloading software (interf_downld).

This second downloading software makes it possible to download the second configuration file from the network. It is advantageously executed on a processor (CPU) or on a dedicated microcontroller, in such a way that the downloading of the second configuration file is then rendered entirely independent of the communications function and of the functional applications of the equipment. Furthermore, when the network is an AFDX® network, the second downloading software is advantageously compliant with the aforementioned standard ARINC 615A.

Figure 5:
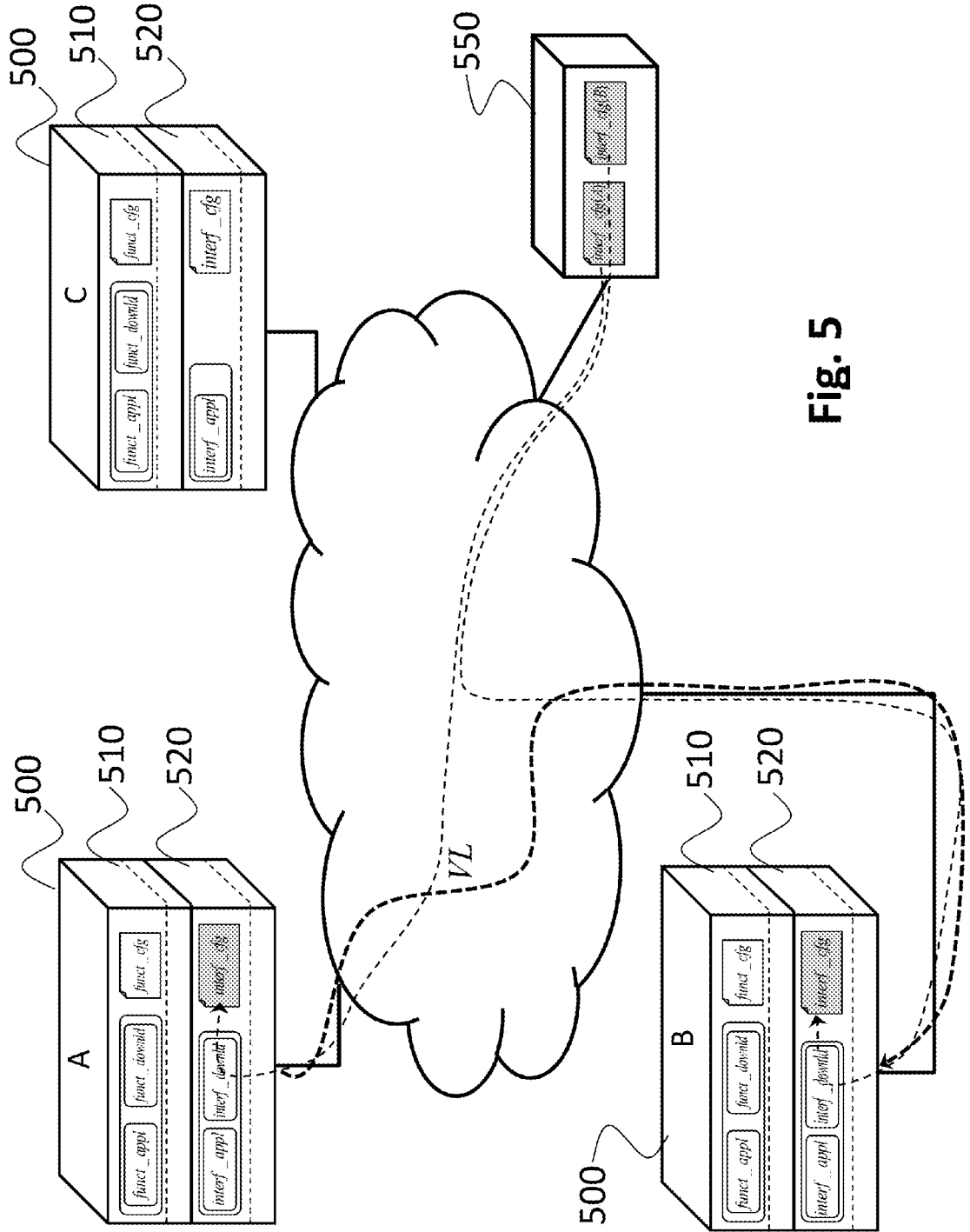
FIG. 5 diagrammatically shows an example of reconfiguring avionics equipment according to the second embodiment of the disclosure.

The FIG. 5 shows an operation of reconfiguring of avionics equipment according to the second embodiment of the disclosure.

This figure shows an avionics network, here an AFDX® network, to which are subscribed a plurality of pieces of avionics equipment, 500. The avionics equipment has the architecture described in relation with FIG. 4.

The downloading software calls upon a download terminal 550, identical to the terminal 350 of FIG. 3. The download terminal is used to update the switching tables of the network as well as the configuration files of the various pieces of avionics equipment.

Downloading the interface configuration files is obtained thanks to a file transfer protocol (TFTP, FTP) between the download terminal 550 and the downloading software present in the second portions 520 of the pieces of equipment. These pieces of downloading software receive from the terminal 550 interface configuration files and store them locally.

In any case, note that the downloading of interface configuration files can be carried out independently, without intervening on the functional portion of the pieces of equipment.

The invention claimed is:

1. Reconfigurable avionics equipment for connection to an onboard network on board an aircraft, the equipment being configured to carry out a predetermined function and comprising:
   a first portion configured to perform the function, with this first portion comprising first hardware and first software, as well as a first configuration file to configure the first hardware and/or the first software, and wherein the first software comprises one or more applications that perform the function; and
   a second portion physically connected between the first portion and the network and configured to interface the first portion with the network by carrying messages between the network and the first portion to enable the first portion to access the network only through the second portion, with this second portion comprising second hardware and second software as well as a second configuration file to configure the second hardware and/or the second software, with the second configuration file being separate from the first one;

wherein the second software comprises a communications application and the second portion is configured to interface the first portion with the network by virtue of the communications application managing a communications protocol stack which allows the one or more applications of the first software to exchange messages with remote applications, and wherein the second portion uses the second configuration file to configure the communications application by parameters extracted or calculated using the second configuration file; and wherein the first portion and the second portion of the reconfigurable avionics equipment are configured to execute the first software and the second software using a common processor shared by the first hardware and the second hardware, and wherein the second portion is configured to execute the second software independently of the first portion executing the first software.

2. The reconfigurable avionics equipment according to claim 1, wherein the network is a network compliant with the Aeronautical Radio (ARINC) 664 part 7 standard and that the first downloading software is compliant with the Aeronautical Radio (ARINC) 615A standard.

3. The reconfigurable avionics equipment according to claim 1, wherein the second software comprises a second downloading software adapted to download the second configuration file from the network.

4. The reconfigurable avionics equipment according to claim 3, wherein the network is a network compliant with the Aeronautical Radio (ARINC) 664 part 7 standard and that the second downloading software is compliant with the Aeronautical Radio (ARINC) 615A standard.

5. The reconfigurable avionics equipment according to claim 3, wherein the second downloading software is executed by a processor that is dedicated to it.

6. The reconfigurable avionics equipment according to claim 1, wherein the second portion is configured to download the second configuration file independently of the first portion downloading the first configuration file.

7. The reconfigurable avionics equipment according to claim 6, wherein the first portion is connected to the network only through the second portion.

8. The reconfigurable avionics equipment according to claim 6, wherein downloading the second configuration file independently of downloading the first configuration file comprises downloading the second configuration file by the second portion without intervention by the first portion.

* * * * *